(12) United States Patent
Hong

(10) Patent No.: US 12,103,489 B2
(45) Date of Patent: Oct. 1, 2024

(54) UNIVERSAL VEHICLE PASSENGER RESTRAINT SYSTEM

(71) Applicant: James Oliver Hong, Little Ferry, NJ (US)

(72) Inventor: James Oliver Hong, Little Ferry, NJ (US)

( * ) Notice: Subject to any disclaimer, the term of this patent is extended or adjusted under 35 U.S.C. 154(b) by 0 days.

(21) Appl. No.: 18/453,834

(22) Filed: Aug. 22, 2023

(65) Prior Publication Data

US 2024/0132012 A1 Apr. 25, 2024
US 2024/0227721 A9 Jul. 11, 2024

Related U.S. Application Data

(60) Provisional application No. 63/475,166, filed on Oct. 21, 2022.

(51) Int. Cl.
*B60R 22/18* (2006.01)
*B60R 22/10* (2006.01)
*B60R 22/26* (2006.01)
*B60R 22/30* (2006.01)

(52) U.S. Cl.
CPC .............. *B60R 22/26* (2013.01); *B60R 22/10* (2013.01); *B60R 22/18* (2013.01); *B60R 22/30* (2013.01); *B60R 2022/1818* (2013.01)

(58) Field of Classification Search
CPC ....... B60R 22/10; B60R 22/105; B60R 22/18; B60R 22/26; B60R 22/30; B60R 2022/028; B60R 2022/1818
See application file for complete search history.

(56) References Cited

U.S. PATENT DOCUMENTS

| 2,833,343 | A | * | 5/1958 | Benson | B60R 22/105 |
| | | | | | 297/473 |
| 2,888,063 | A | | 5/1959 | Rose | |
| 3,169,036 | A | * | 2/1965 | Bertice | B60N 2/283 |
| | | | | | 297/484 |
| 3,529,864 | A | * | 9/1970 | Sharp | B60R 22/105 |
| | | | | | 297/473 |

(Continued)

FOREIGN PATENT DOCUMENTS

| DE | 102019200249 A1 * | 7/2020 | ............. B60R 22/30 |
| FR | 2847217 A1 * | 5/2004 | ........... B60R 22/105 |

(Continued)

*Primary Examiner* — Barry Gooden, Jr.
(74) *Attorney, Agent, or Firm* — Alston & Bird LLP

(57) ABSTRACT

Methods, apparatuses, systems, and/or the like are provided. An example method may include a vehicle restraint system. An example vehicle restraint system may include a first restraint hook array, a second restraint hook array, at least one restraint strap, and a restraint closure assembly. An example first restraint hook array may extend from the back portion of a vehicle seat and define at least one back restraint lock channel. An example second restraint hook array may extend from the seat portion of a vehicle seat and define at least one seat restraint lock channel. An example restraint strap may be configured to securely engage to at least one of the back restraint lock channels or to at least one of the seat restraint lock channels. An example restraint closure assembly may be configured to slidably close and secure an occupant seated in the vehicle.

16 Claims, 13 Drawing Sheets

(56) References Cited

U.S. PATENT DOCUMENTS

| | | | | |
|---|---|---|---|---|
| 4,205,670 A * | 6/1980 | Owens | B60R 22/105 | 297/464 |
| 4,289,352 A * | 9/1981 | Ashworth | B60R 22/30 | 297/483 |
| 4,324,204 A * | 4/1982 | Friedman | B60R 22/10 | 280/801.1 |
| 4,632,425 A * | 12/1986 | Barratt | B60R 22/14 | 280/808 |
| 4,973,083 A * | 11/1990 | Richards | B60R 22/26 | 297/483 |
| 5,169,174 A * | 12/1992 | Gray | B60R 22/024 | 297/483 |
| 5,215,354 A * | 6/1993 | Grene | B60N 2/24 | 297/484 |
| 5,358,310 A * | 10/1994 | Nemoto | B60R 22/201 | 297/483 |
| 5,628,548 A * | 5/1997 | Lacoste | B60R 22/02 | 297/484 |
| 5,733,004 A * | 3/1998 | Celestina-Krevh | B60N 2/26 | 297/483 |
| 6,312,056 B1 * | 11/2001 | Murphy | B60R 22/26 | 297/483 |
| 6,402,251 B1 * | 6/2002 | Stoll | B60R 22/105 | 297/484 |
| 6,676,219 B1 * | 1/2004 | Brewer | B60R 22/023 | 297/483 |
| 6,688,701 B1 * | 2/2004 | Weaver | B60R 22/105 | 297/484 |
| 6,846,020 B2 * | 1/2005 | Xu | B60R 22/26 | 280/808 |
| 7,144,085 B2 | 12/2006 | Vits et al. | | |
| 7,488,038 B2 * | 2/2009 | Boyle | B60N 2/2851 | 297/484 |
| 7,520,532 B2 * | 4/2009 | Bell | B60N 2/688 | 280/808 |
| 7,571,934 B2 * | 8/2009 | Bell | B60R 22/20 | 280/801.1 |
| 8,002,358 B2 * | 8/2011 | Marriott | B60R 22/201 | 280/808 |
| 8,061,781 B2 | 11/2011 | Foye et al. | | |
| 8,360,521 B2 * | 1/2013 | Macliver | B60R 22/20 | 297/483 |
| 9,156,435 B2 * | 10/2015 | Smith | B60N 2/242 | |
| 9,358,947 B1 * | 6/2016 | Zorn | B60R 22/26 | |
| 9,776,534 B2 * | 10/2017 | Yang | B60N 2/2812 | |
| 10,391,896 B1 * | 8/2019 | Daniels | B60R 22/26 | |
| 11,679,736 B2 * | 6/2023 | Lane | B60R 22/023 | 280/808 |
| 2004/0061323 A1 * | 4/2004 | Xu | B60R 22/20 | 280/801.1 |
| 2007/0001495 A1 * | 1/2007 | Boyle | B60N 2/2806 | 297/484 |
| 2007/0182235 A1 * | 8/2007 | Fonseca De Arruda | B60N 2/2812 | 297/468 |
| 2008/0100051 A1 * | 5/2008 | Bell | B60R 22/20 | 280/801.1 |
| 2008/0100122 A1 * | 5/2008 | Bell | B60N 2/688 | 297/468 |
| 2008/0122214 A1 * | 5/2008 | Bell | B60R 22/024 | 280/801.1 |
| 2009/0212549 A1 * | 8/2009 | Jones | B60R 22/14 | 280/801.2 |
| 2012/0274115 A1 * | 11/2012 | Smith | B60N 2/688 | 297/354.1 |
| 2012/0274120 A1 * | 11/2012 | Smith | B60N 2/686 | 242/615.3 |
| 2014/0152072 A1 * | 6/2014 | Sumroy | B60R 22/18 | 297/464 |
| 2014/0339801 A1 * | 11/2014 | Seidenberger | B60R 22/18 | 280/808 |
| 2019/0077364 A1 * | 3/2019 | Murray, Sr | B60R 22/023 | |
| 2019/0315307 A1 * | 10/2019 | Macaluso | B60R 22/105 | |
| 2019/0380299 A1 * | 12/2019 | Shewfelt | B60R 22/10 | |
| 2020/0079316 A1 * | 3/2020 | Nassoiy | B60R 22/18 | |
| 2020/0086823 A1 * | 3/2020 | Koop | A01K 27/002 | |
| 2021/0078525 A1 * | 3/2021 | Hitzfelder | B60N 2/24 | |
| 2022/0242361 A1 * | 8/2022 | Agam | B60N 2/242 | |

FOREIGN PATENT DOCUMENTS

| | | | | |
|---|---|---|---|---|
| GB | 2302261 A | * | 1/1997 | A01K 27/002 |
| GB | 2441520 A | * | 3/2008 | B60R 22/105 |
| GB | 2537422 A | * | 10/2016 | B60N 2/30 |
| JP | 2008290587 A | * | 12/2008 | B60N 2/2812 |
| KR | 20130050968 A | * | 5/2013 | B60N 2/2812 |
| WO | WO-2012014555 A1 | * | 2/2012 | B60N 2/2812 |
| WO | WO-2012053420 A1 | * | 4/2012 | B60N 2/265 |
| WO | WO-2015030668 A1 | * | 3/2015 | A61G 1/04 |

* cited by examiner

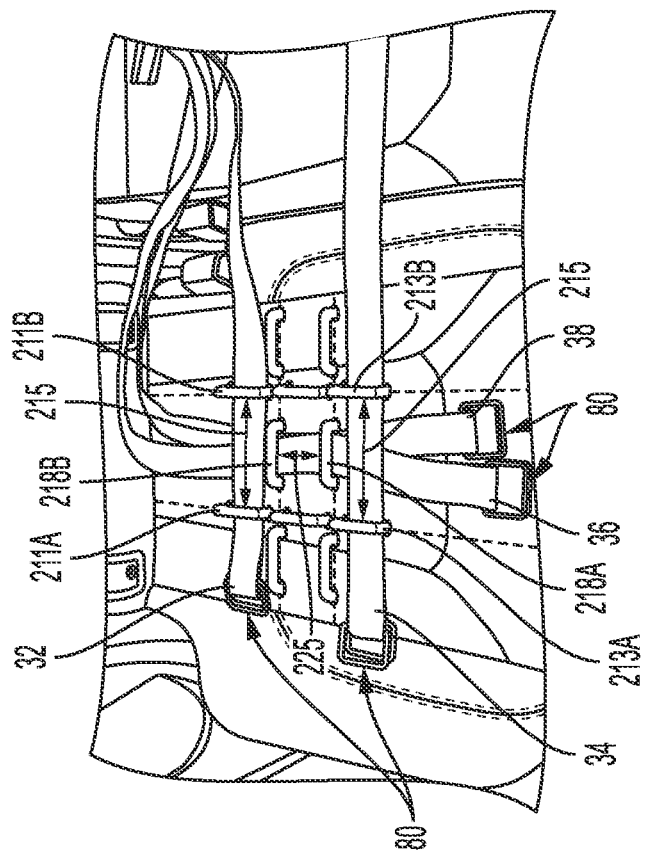
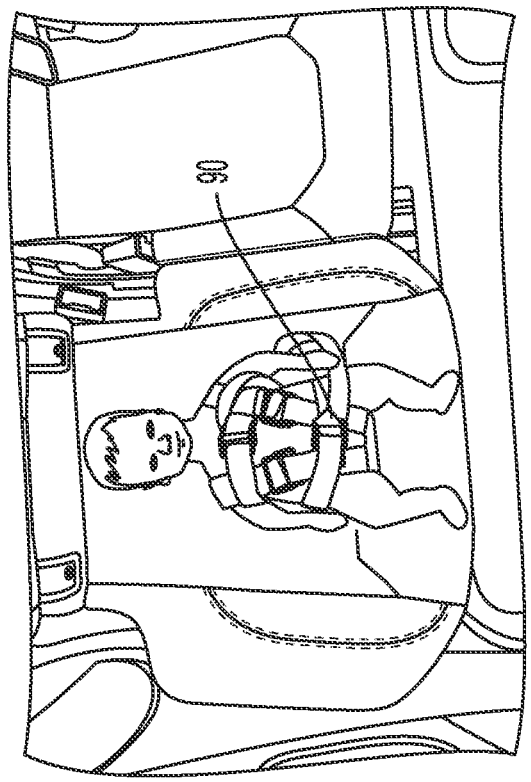
FIG. 7A
FIG. 7B

UNIVERSAL VEHICLE PASSENGER RESTRAINT SYSTEM

CROSS-REFERENCE TO RELATED APPLICATIONS

This application is a U.S. Nonprovisional Application and claims priority to U.S. Provisional Application No. 63/475,166 filed on Oct. 21, 2022, the contents of which are hereby incorporated by reference in their entirety.

BACKGROUND

Vehicle restraint systems are commonly used in various types of motor vehicles to protect occupants of the vehicles in cases of collisions. However, conventional vehicle restraint systems have various deficiencies. For example, the design of conventional vehicle restraint systems makes such system susceptible to improper use which inevitably reduces the effectiveness of the restraint system. Conventional vehicle restraint systems also do not provide adequate protection for infants and children without the use of expensive and cumbersome child seats. Through applied effort, ingenuity, and innovation, many deficiencies of conventional systems have been solved by developing solutions that are in accordance with the embodiments of the present invention, many examples of which are described in detail herein.

BRIEF SUMMARY

Various embodiments are directed to a restraint system for vehicle passenger that may be designed into and built into the vehicle passenger seats for cars, SUVs, minivans, vans, trucks, buses, trains, even airplanes. The restraint system comprises a plurality of hooks, belts with restraint straps and buckles that are configured to provide a comfortable and safe restraint system for infants, children, and adults. In certain embodiments, the restraint system can be portable for use in various transportation systems including cars, SUVs, minivans, vans, trucks, trains, and airplanes.

Various embodiments of the present disclosure may include a vehicle restraint system. In some embodiments, the vehicle restraint system may be configured for deployment in connection with a vehicle seat comprising a seat portion and a back portion. In some embodiments, the vehicle restraint system may include a first restraint hook array that may be configured to extend from the back portion of the vehicle seat. In some embodiments, the first restraint hook array may define at least one back restrain lock channel. In some embodiments, the vehicle restraint system may include a second restraint hook array that may be configured to extend from the seat portion of the vehicle seat. In some embodiments, the second restraint hook array may define at least one seat restrain lock channel. In some embodiments, the vehicle restraint system may further include at least one restraint strap that may be configured to securely engage to at least one of the back restraint lock channel or to the at least one seat restraint lock channel. In some embodiments, the vehicle restraint system may further include a restrain closure assembly that may be structured to slidably close the at least one restraint strap to define a restraint closure assembly that is configured to secure an occupant seated in the vehicle.

In some embodiments, the first restraint hook array may comprise at least two parallel hook members that may be securely anchored to a frame portion of the vehicle seat. In some embodiments, the at least two parallel hook members may combine to define at least one back restraint lock channel.

In some embodiments, the second restraint hook array may comprise at least two parallel hook members that may be securely anchored to a frame portion of the vehicle seat. In some embodiments, the at least two parallel hook members may combine to define at least one seat restraint lock channel.

In some embodiments, the first restraint hook array may comprise at least two sets of parallel hook members that may be securely anchored to a frame portion of the vehicle seat. In some embodiments, the at least two sets of parallel hook members may combine to define at least two back restraint lock channels.

In some embodiments, the second restraint hook array may comprise at least two sets of parallel hook members that may be securely anchored to a frame portion of the vehicle seat. In some embodiments, the at least two sets of parallel hook members may combine to define at least two seat restraint lock channels.

In some embodiments, the second restraint hook array may comprise a plurality of parallel hook members that may be securely anchored to a frame portion of the vehicle seat. In some embodiments, the plurality of parallel hook members may combine to define a first seat restraint lock channel configured to receive a first restraint strap extending along a first direction and a second seat restraint lock channel configured to receive a second restraint strap extending along a second direction.

In some embodiments, the first restraint hook array may comprise at least two sets of parallel hook members that may be securely anchored to a frame portion of the vehicle seat. In some embodiments, the at least two sets of parallel hook members may combine to define at least two back restraint lock channels position in a spaced arrangement along the back portion of the vehicle seat to receive restraint strap positioned to accommodate occupants of different heights.

In some embodiments, the vehicle restraint system may comprise another restraint strap that may be configured to securely engage the other of the at least one back restraint lock channel or the at least one seat restraint lock channel. In some embodiments, another restraint closure assembly may be structured to slidably close another restraint strap to define another restraint closure assembly that is configured to secure the occupant seated in the vehicle.

Various embodiments are directed to a method for securing an occupant to a vehicle seat within a vehicle that may be designed into cars, SUVs, minivans, vans, trucks, buses, trains, even airplanes. The method comprises a vehicle restraint system that comprises a plurality of hooks, belts with restraint straps and buckles that are configured to provide a comfortable and safe restraint system for infants, children, and adults. In certain embodiments, the restraint system can be portable for use in various transportation systems including cars, SUVs, minivans, vans, trucks, trains, and airplanes.

Various embodiments of the present disclosure may include a method that comprises a vehicle restraint system. In some embodiments, the vehicle restraint system may include a first restraint hook array that may be configured to extend from the back portion of the vehicle seat. In some embodiments, the first restraint hook array may define at least one back restraint lock channel. In some embodiments, the vehicle restraint system may include a second restraint hook array that may be configured to extend from the seat portion of the vehicle seat. In some embodiments, the vehicle restraint system may further include at least one restraint strap that may be configured to securely engage to at least one of the back restraint lock channel or to the at least one seat restraint lock channel. In some embodiments, the vehicle restraint system may further include a restrain closure assembly that may be structured to slidably close the at least one restraint strap to define a restraint closure assembly that is configured to secure an occupant seated in the vehicle. In some embodiments, the method may further comprise securing the occupant with at least one restraint strap via the restraint closure assembly. In some embodiments, the restraint closure assembly slides close keeping the at least one restraint strap secured to the hook array and/or the occupant.

In some embodiments, the first restraint hook array may comprise at least two parallel hook members that may be securely anchored to a frame portion of the vehicle seat. In some embodiments, the at least two parallel hook members may combine to define at least one back restraint lock channel.

In some embodiments, the second restraint hook array may comprise at least two parallel hook members that may be securely anchored to a frame portion of the vehicle seat. In some embodiments, the at least two parallel hook members may combine to define at least one seat restraint lock channel.

In some embodiments, the first restraint hook array may comprise at least two sets of parallel hook members that may be securely anchored to a frame portion of the vehicle seat. In some embodiments, the at least two sets of parallel hook members may combine to define at least two back restraint lock channels.

In some embodiments, the second restraint hook array may comprise at least two sets of parallel hook members that may be securely anchored to a frame portion of the vehicle seat. In some embodiments, the at least two sets of parallel hook members may combine to define at least two seat restrain lock channels.

In some embodiments, the second restraint hook array may comprise a plurality of parallel hook members that may be securely anchored to a frame portion of the vehicle seat. In some embodiments, the plurality of parallel hook members may combine to define a first seat restraint lock channel configured to receive a first restraint strap extending along a first direction and a second seat restraint lock channel configured to receive a second restraint strap extending along a second direction.

In some embodiments, the first restraint hook array may comprise at least two sets of parallel hook members that may be securely anchored to a frame portion of the vehicle seat. In some embodiments, the at least two sets of parallel hook members may combine to define at least two back restraint lock channels position in a spaced arrangement along the back portion of the vehicle seat to receive restraint strap positioned to accommodate occupants of different heights.

In some embodiments, the method may further comprise another restraint strap that may be configured to securely engage the other of the at least one back restraint lock channel or the at least one seat restraint lock channel. In some embodiments, another restraint closure assembly may be structured to slidably close another restraint strap to define another restraint closure assembly that is configured to secure the occupant seated in the vehicle.

In some embodiments, the method may further comprise a restraint closure assembly with a first closure ring and a second closure ring.

In some embodiments, the method may further comprise drawing at least a portion of the restraint strap over the second closure ring and then under the first closure ring. In some embodiments, the occupant may tighten the restraint strap by pulling on an end of the restraint strap.

In some embodiments, the method may further comprise creating a second lock loop with the restraint strap. In some embodiments the second lock loop provides additional security and resistance to prevent back-sliding of the restraint closure assembly.

In some embodiments, the creating of the second lock loop comprises looping the end of the restraint strap through the first closure ring and the second closure ring for a second time and wrapping the end of the restraint strap under the second closure ring creating the second lock loop.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Figure 1B:
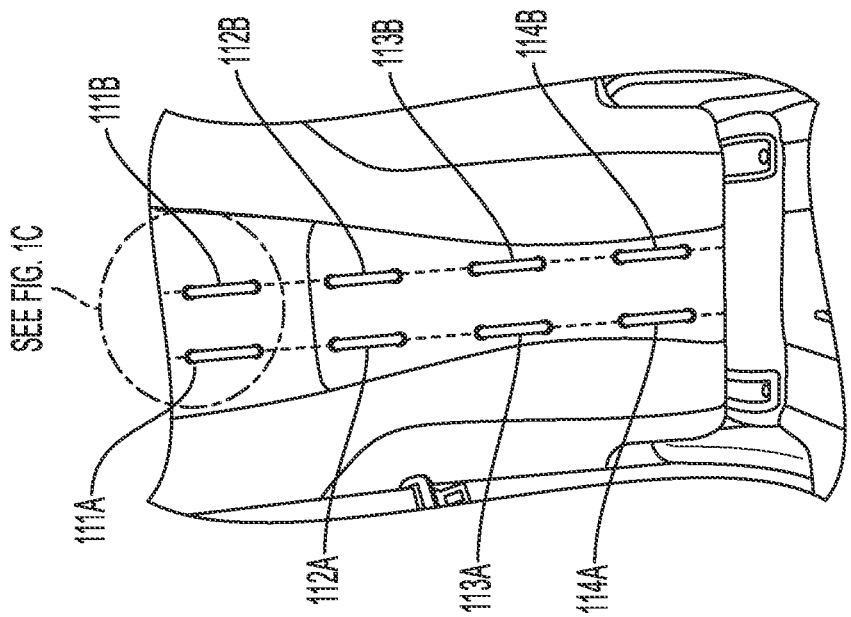
Figure 1A:
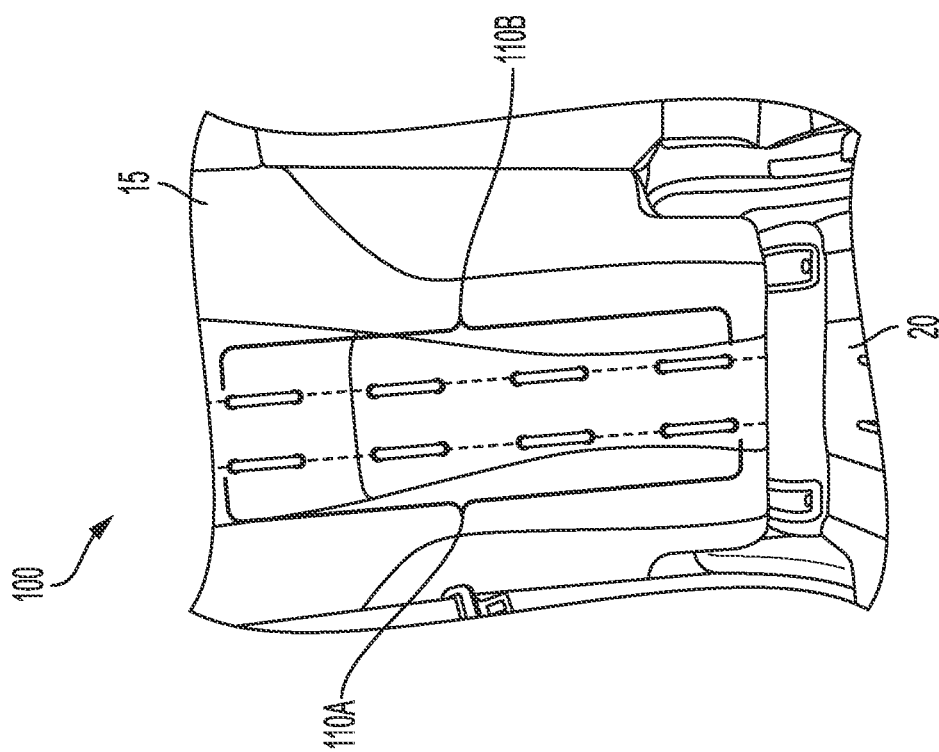
Figure 1C:
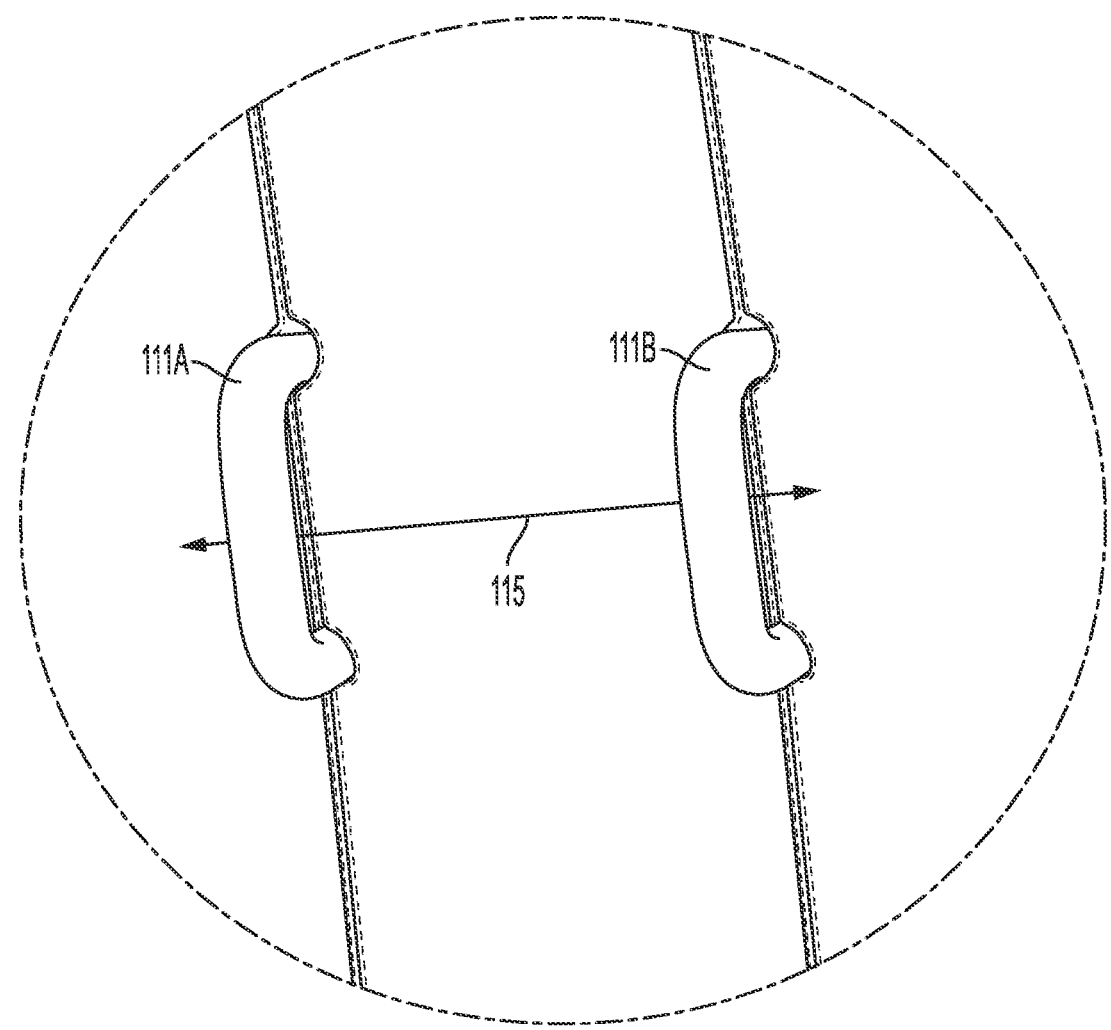
Figure 2:
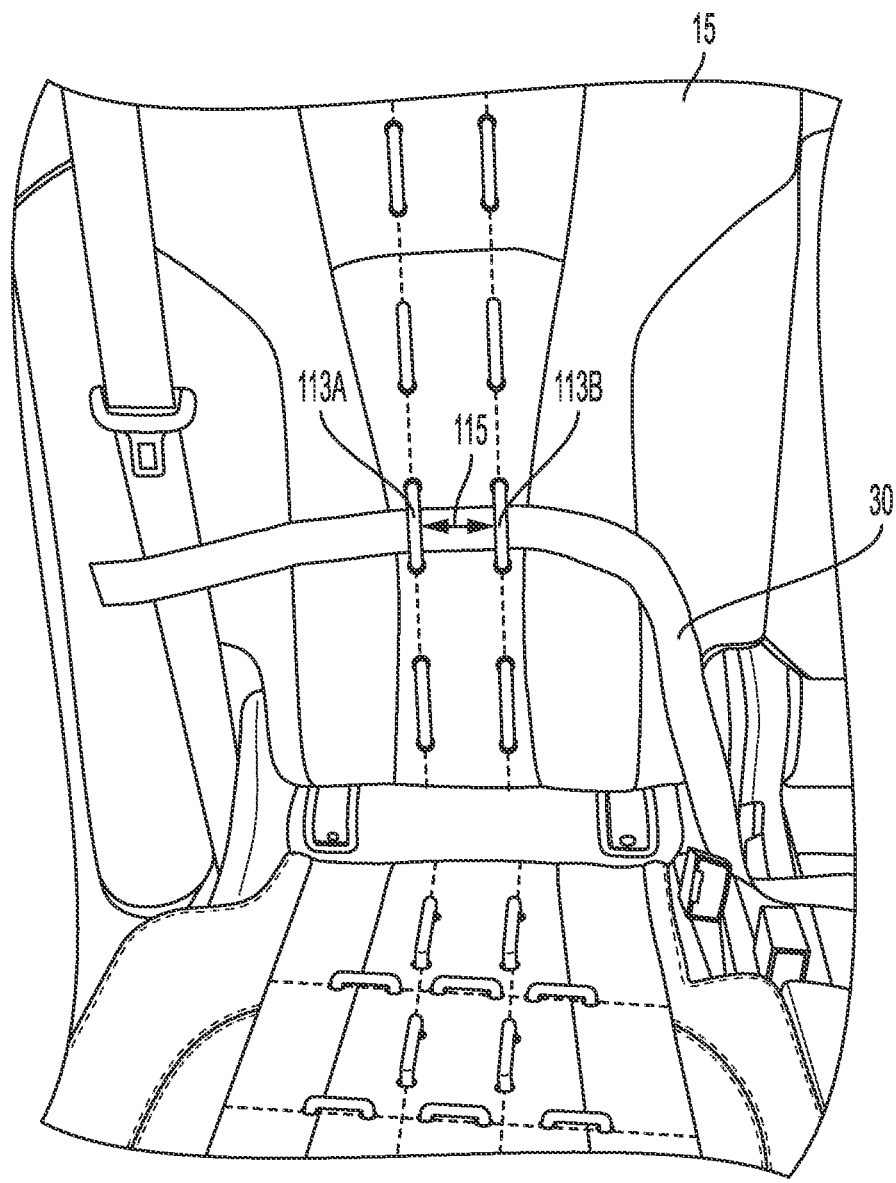
Figure 3B:
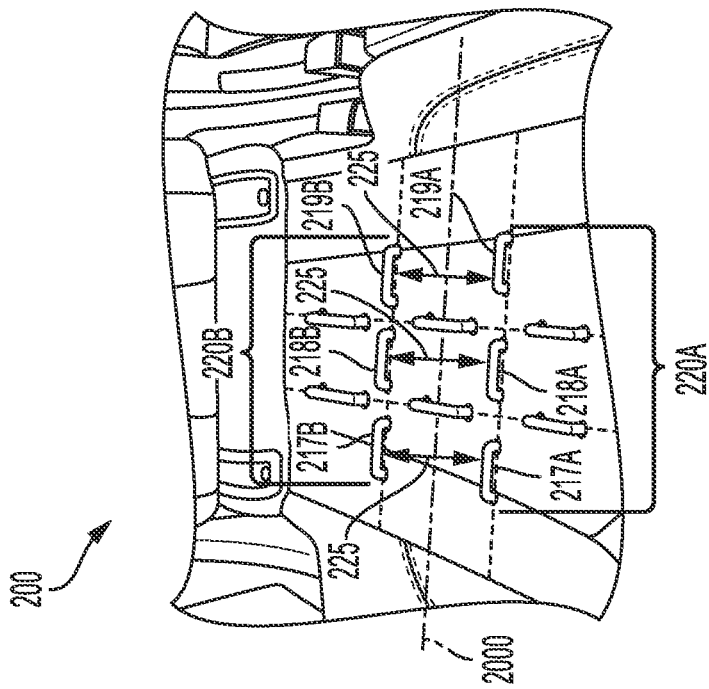
Figure 3A:
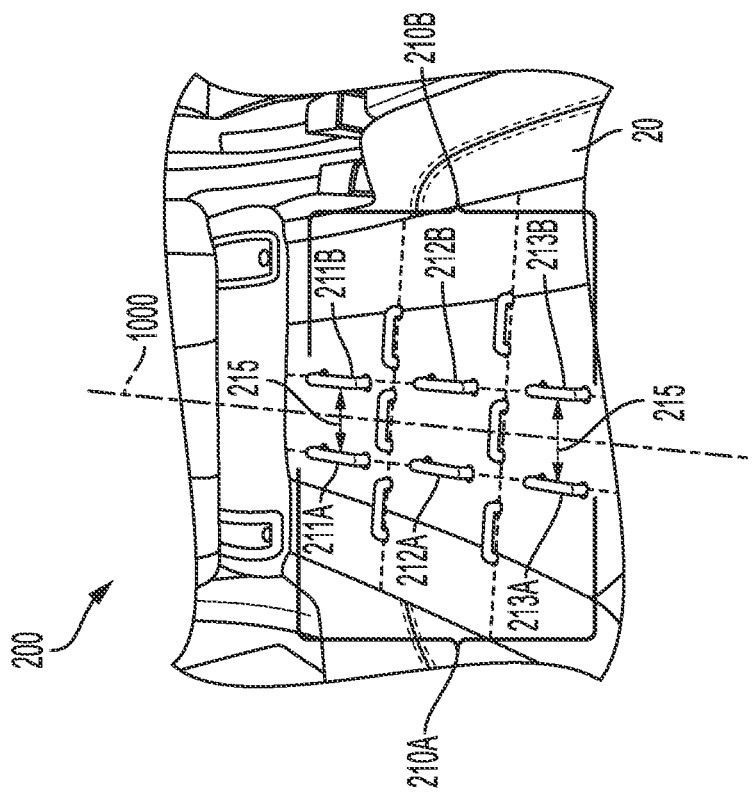
Figure 4B:
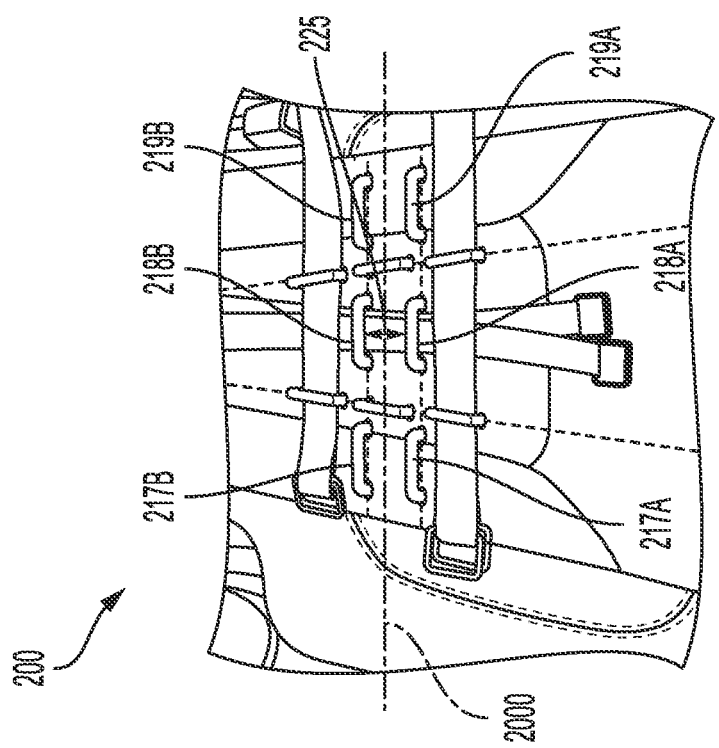
Figure 4A:
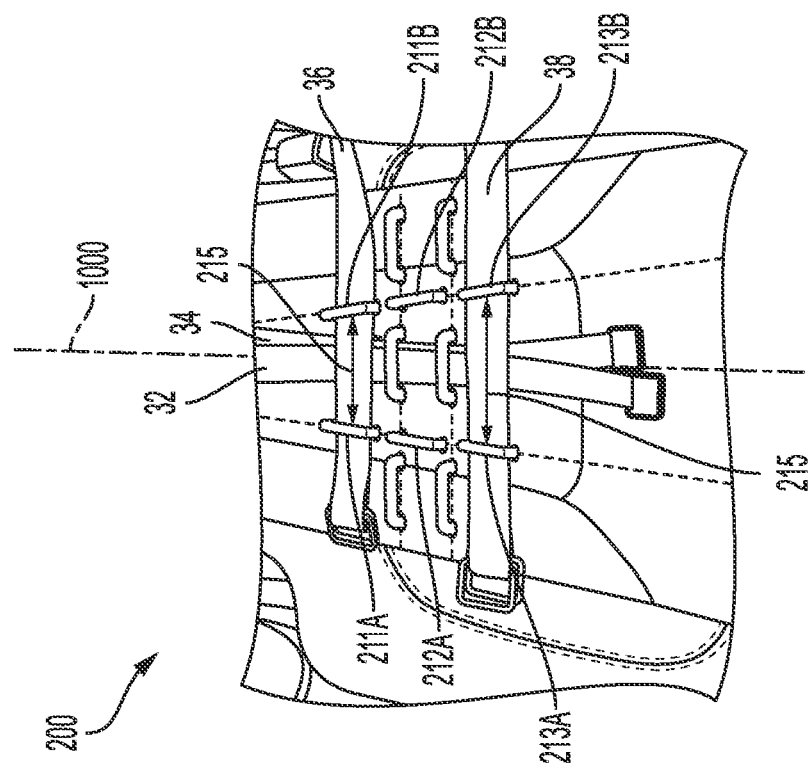
Figure 5B:
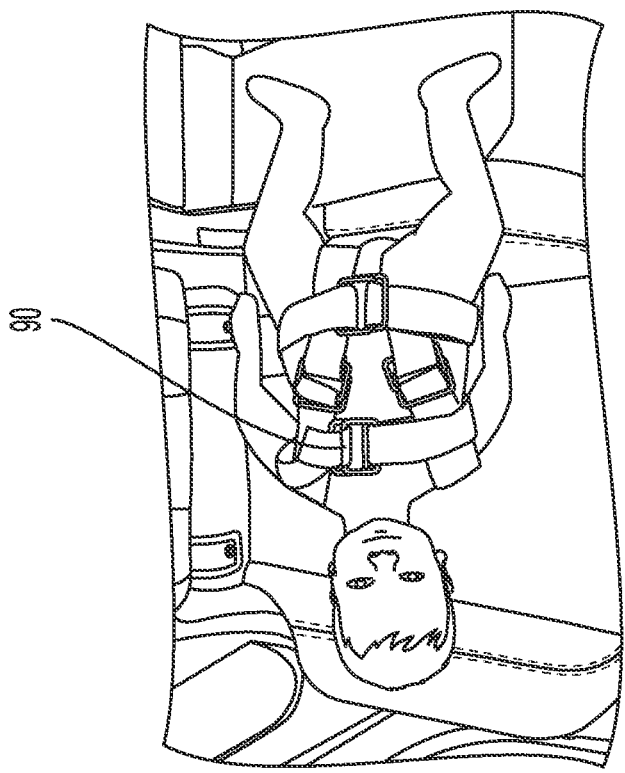
Figure 5A:
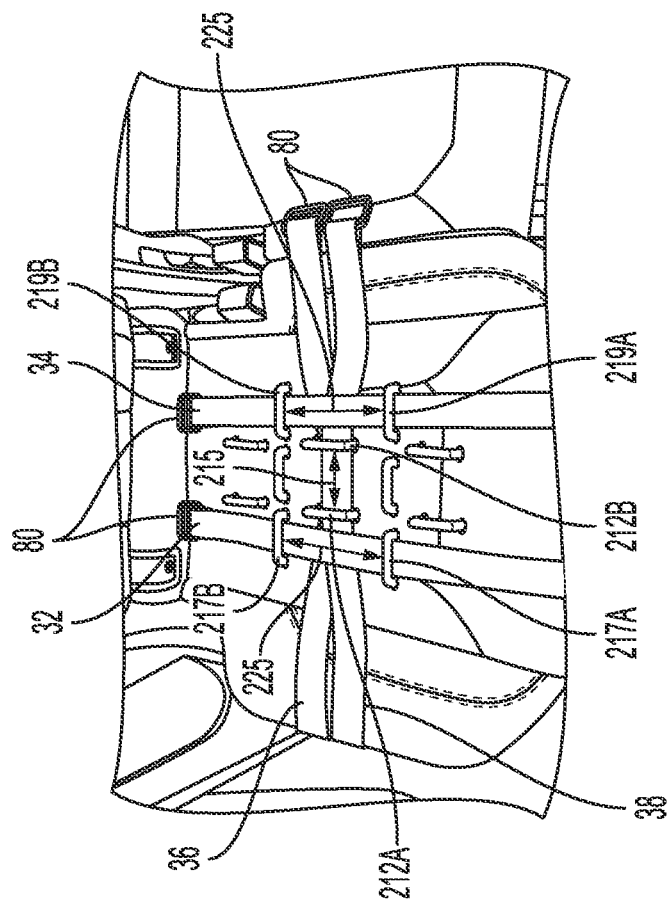
Figure 6B:
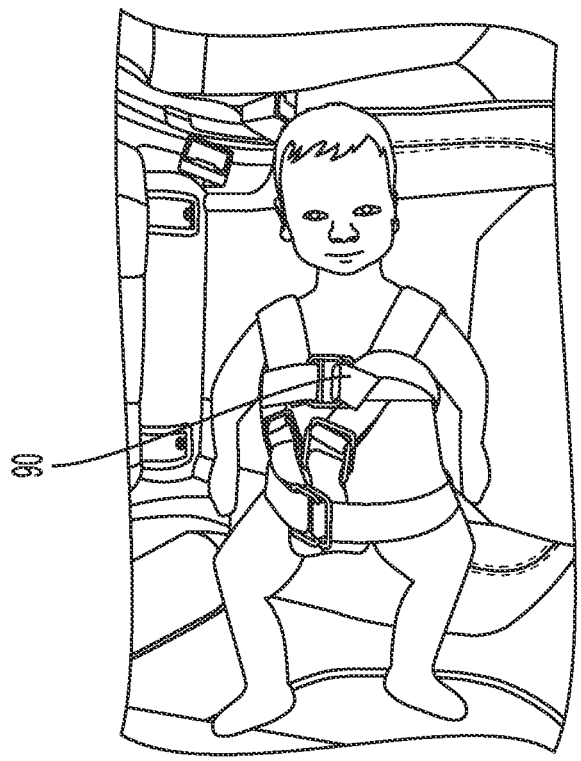
Figure 6A:
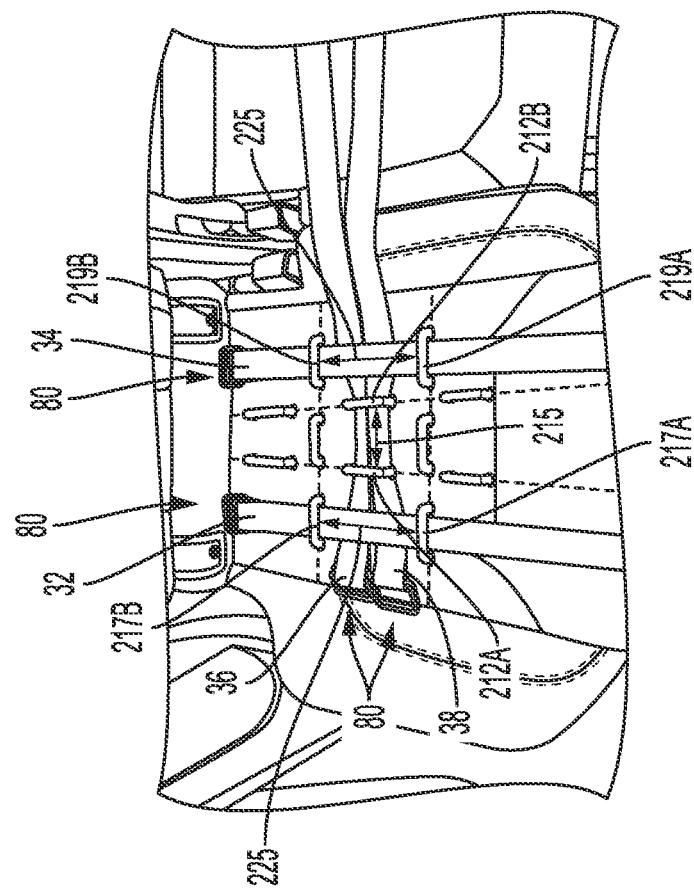
Figure 8A:
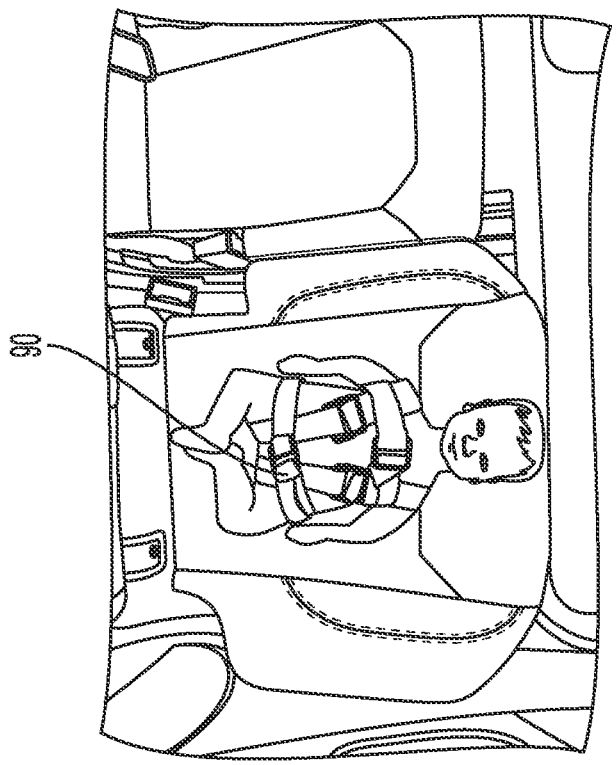
Figure 8B:
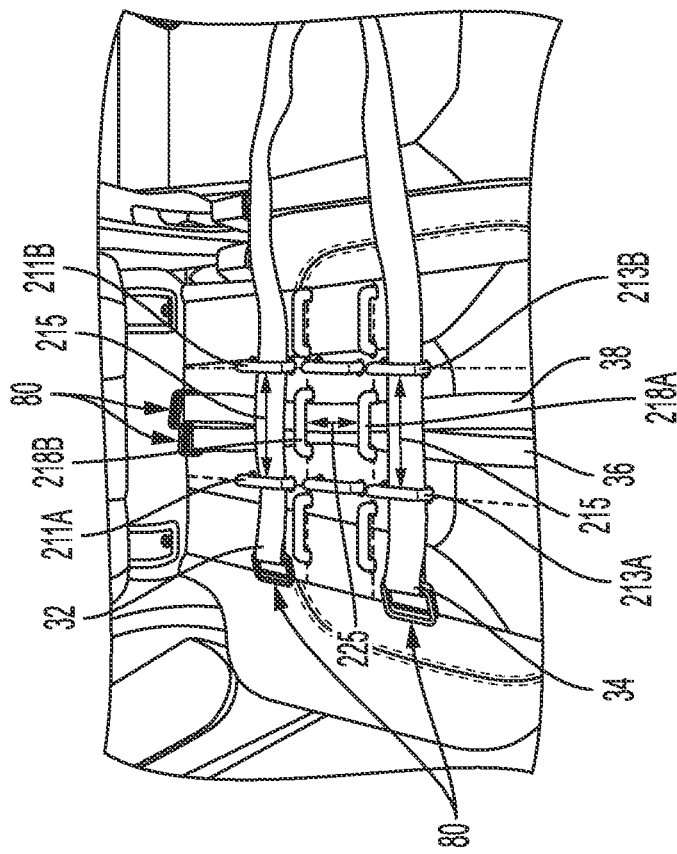
Figure 9C:
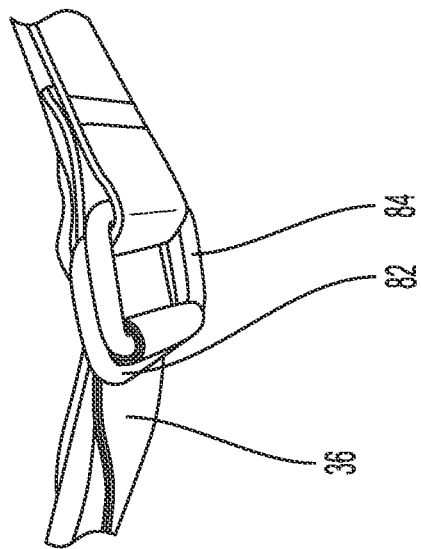
Figure 9B:
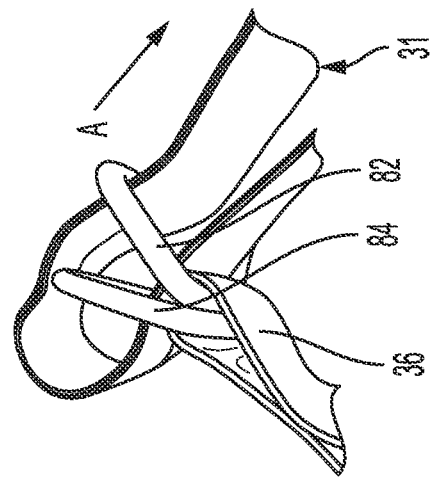
Figure 9A:
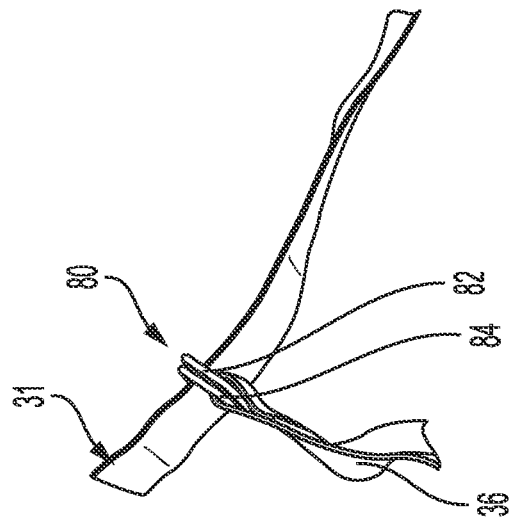
Figure 10:
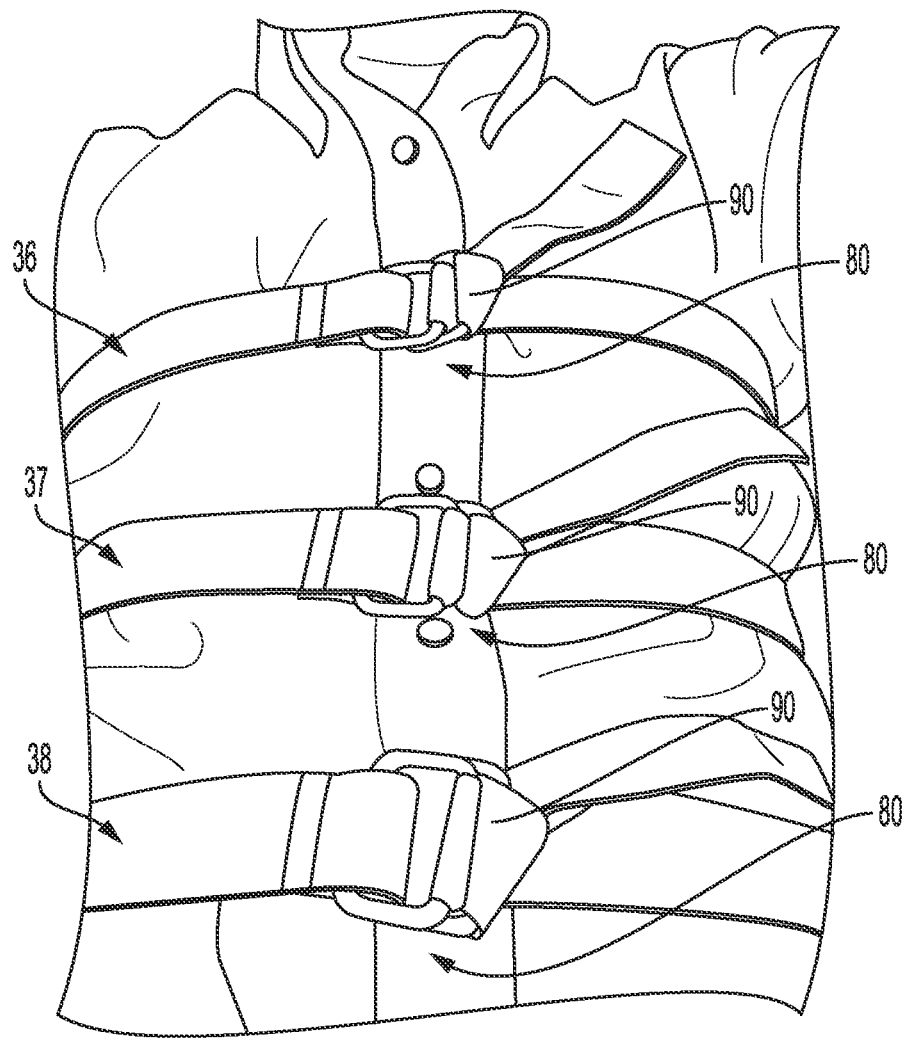
Figure 11:
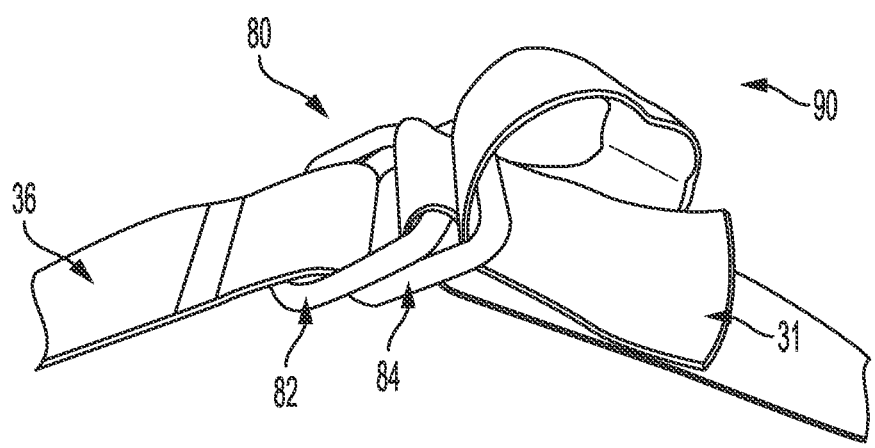
Figure 12:
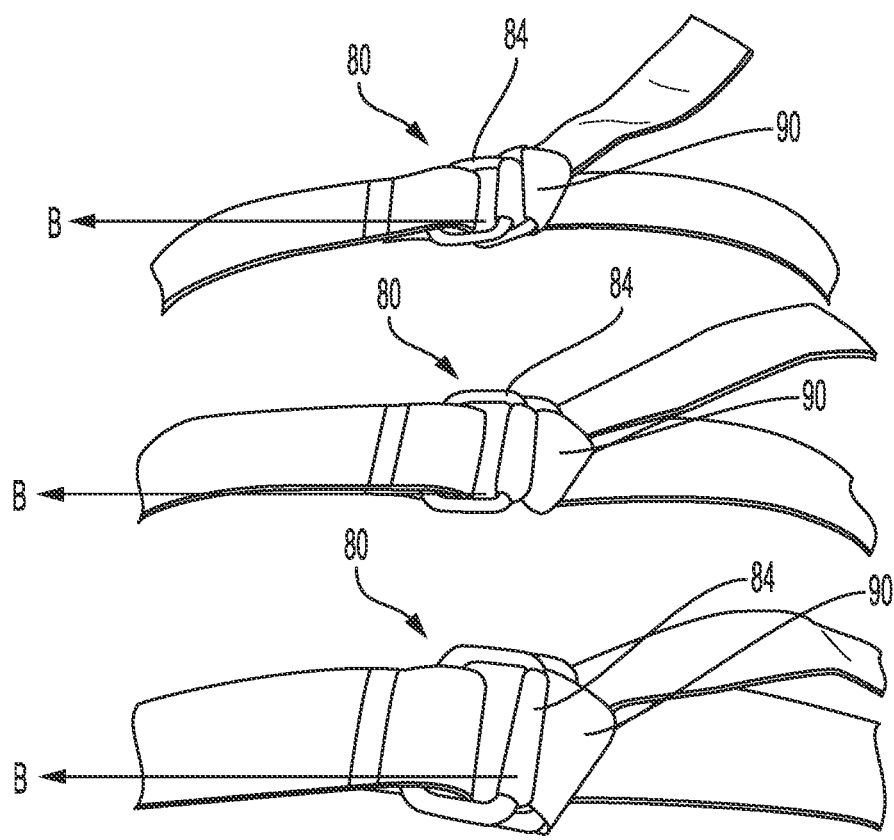

Having thus described some embodiments in general terms, references will now be made to the accompanying drawings, which are not drawn to scale, and wherein:

FIG. 1A illustrates an exemplary first restraint array of the back portion in accordance with various embodiments of the present disclosure;

FIG. 1B illustrates an exemplary plurality of back restraint lock channels defined by an example first restraint array in accordance with various embodiments of the present disclosure;

FIG. 1C illustrates a detail view of an example back restraint lock channel defined by two parallel hook members of the first restraint hook array of FIG. 1B, wherein the detail view is taken along detail circle 1C of FIG. 1B;

FIG. 2 illustrates an exemplary restraint strap secured in an example back restraint lock channel in accordance with various embodiments of the present disclosure;

FIG. 3A illustrates an exemplary second restraint array comprising hook members aligned in a first direction of the seat portion in accordance with various embodiments of the present disclosure;

FIG. 3B illustrates an exemplary second restraint array comprising hook members aligned in a second direction of the seat portion in accordance with various embodiments of the present disclosure;

FIG. 4A illustrates an exemplary plurality of seat restraint lock channels aligned in a first direction in accordance with various embodiments of the present disclosure;

FIG. 4B illustrates an exemplary plurality of seat restraint lock channels aligned in a second direction in accordance with various embodiments of the present disclosure;

FIGS. 5A-5B illustrate an exemplary first restraint strap layout pattern configured in accordance with various embodiments of the present disclosure;

FIGS. 6A-6B illustrate an exemplary second restraint strap layout pattern configured in accordance with various embodiments of the present disclosure;

FIGS. 7A-7B illustrate an exemplary third restraint strap layout pattern configured in accordance with various embodiments of the present disclosure;

FIGS. 8A-8B illustrate an exemplary fourth restraint strap layout pattern configured in accordance with various embodiments of the present disclosure;

FIGS. 9A-9C illustrate an exemplary restraint closure assembly of a restraint strap in accordance with various embodiments of the present disclosure;

FIG. 10 illustrates a plurality of exemplary restraint straps securing an occupant to a vehicle seat in accordance with various embodiments of the present disclosure;

FIG. 11 illustrates an exemplary restraint closure assembly configured to define a restraint closure assembly in accordance with various embodiments of the present disclosure; and FIG. 12 illustrates an exemplary restraint closure assembly defining a release mechanism for a restraint strap in accordance with various embodiments of the present disclosure.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment. As used herein, the terms "example," "exemplary," and the like are used to "serving as an example, instance, or illustration." Any implementation, aspect, or design described herein as "example" or "exemplary" is not necessarily to be construed as preferred or advantageous over other implementations, aspects, or designs. Rather, use of the terms "example," "exemplary," and the like are intended to present concepts in a concrete fashion.

The figures are provided to illustrate some examples of the invention described. The figures are not to limit the scope of the present embodiment of the invention or the appended claims. Aspects of the example embodiment are described below with reference to example applications for illustration. It should be understood that specific details, relationships, and methods are set forth to provide a full understanding of the example embodiment. One of ordinary skill in the art recognize the example embodiment can be practice without one or more specific details and/or with other methods.

FIGS. 1A-1B illustrate an exemplary first restraint hook array 100 of a vehicle restraint system configured for deployment in connection with a back portion 15 of a vehicle seat in accordance with various embodiments. The depicted vehicle seat further comprises a seat portion 20 that will be discussed in further detail in connection with FIGS. 3A-3B below. The depicted first restraint hook array 100 is defined by a first column of hook members 110A positioned in parallel to a second column of hook members 110B. Said differently, the depicted first restraint hook array 100 defines a series of (e.g., 4) parallel hook members 111A/B, 112A/B, 113A/B, and 114A/B.

Each parallel hook member 111A/B is comprised of a C-shaped rigid bar or bracket that extends from or otherwise rigidly attaches to a frame portion of the vehicle seat as shown in FIG. 1C. In some embodiments, during manufacture of vehicle seats, the parallel hook members 111A/B may be installed by welding the parallel hook members 111A/B to the seat frame, mechanically screwing the parallel hook members 111A/B to the seat frame, or any other secure means that securely fastens the parallel hook members 111A/B to the vehicle seat. Similar fastening approaches may be taken in connection with other hook members discussed herein including, without limitation, those discussed below in connection with FIGS. 2, 3A-B, and 4A-B.

In various embodiments, each of the parallel hook members 111A/B may be secured to the frame of the vehicle seat in a manner that does not inhibit the comfort of a seat occupant. For example, the parallel hook members 111A/B may be embedded in seams of seat cushions or otherwise embedded under the surface of the seat cushions so that they do not protrude and press painfully against the seat occupant.

Each pair of parallel hook members 111A/B defines a back restraint lock channel 115 that is structured to slidably receive a restraint strap as shown in FIG. 2. Thus, in reference to FIG. 1B, the depicted series of parallel hook members 111A/B, 112A/B, 113A/B, and 114A/B each define respective back restraint lock channels similar to the example back restraint lock channel 115 shown in FIG. 1C. In various embodiments, first restraint hook arrays 100 may include more or fewer parallel hook members so as to define more or fewer back restraint lock channels. This flexibility might be useful, for example, to configure a selected first restraint hook array to secure occupants of different heights, weights, sizes, and/or the like.

FIG. 2 depicts an example restraint strap 30 that is configured to securely engage an example back restraint lock channel 115 defined by parallel hook members 113A/B extending from the back portion 15 of a vehicle seat. More specifically, the depicted restraint strap 30 has been threaded through the example back restraint lock channel 115 as shown. In various embodiments, additional restraint straps (not shown) may be similarly threaded through other back restraint lock channels defined by other parallel hook members of the first restraint hook array. For example, as illustrated and discussed in connection with FIG. 10 below, three restraint straps might be anchored by three respective back restraint lock channels so as to securely fasten the torso of an occupant against the back portion 15 of the vehicle seat.

FIGS. 3A-3B illustrate an exemplary second restraint hook array 200 of a vehicle restraint system configured for deployment in connection with a seat portion 20 of a vehicle seat in accordance with various embodiments. The depicted second restraint hook array 200 is defined by a first longitudinal column of hook members 210A positioned in parallel to a second longitudinal column of hook members 210B. Said differently, the depicted second restraint hook array 200 defines a series of (e.g., 3) parallel hook members 211A/B, 212A/B, and 213A/B.

Each parallel hook member 211A/B, 212A/B, and 213A/B is comprised of a C-shaped rigid bar or bracket that extends from or otherwise rigidly attaches to a frame portion of the vehicle seat similar to that shown in FIG. 1C. Each pair of parallel hook members 211A/B, 212A/B, and 213A/B define a seat restraint lock channel 215 that is structured to slidably receive a restraint strap. Thus, in reference to FIG. 3A, the depicted series of parallel hook members 211A/B, 212A/B, and 213A/B each define respective seat restraint lock channels 215 that are dispersed generally along a longitudinal axis 1000 of the seat portion of a vehicle seat.

The depicted second restraint hook array 200 is further defined by a first lateral column of hook members 220A positioned in parallel to a second lateral column of hook members 220B. Said differently, the depicted second restraint hook array 200 defines a series of (e.g., 3) parallel hook members 217A/B, 218A/B, and 219A/B.

Each parallel hook member 217A/B, 218A/B, and 219A/B is comprised of a C-shaped rigid bar or bracket that extends from or otherwise rigidly attaches to a frame portion of the vehicle seat similar to that shown in FIG. 1C. Each pair of parallel hook members 217A/B, 218A/B, and 219A/B define a seat restraint lock channel 225 that is structured to slidably receive a restraint strap. Thus, in reference to FIG. 3B, the depicted series of parallel hook members 217A/B, 218A/B, and 219A/B each define respective seat restraint lock channels 225 that are dispersed generally along a lateral axis 2000 of the seat portion of a vehicle seat.

Turning to FIGS. 4A-4B, the depicted second restraint hook array 200 is configured to receive and secure restraint straps 32, 34 extending generally in alignment to the longitudinal axis 1000 and restraint straps 36, 38 extending generally in alignment to the lateral axis 2000. In particular, restraint straps 32, 34 extend through a first seat restraint lock channel 225 defined by parallel hook members 218A/B. In the depicted embodiment, restraint straps 32, 34 are depicted side-by-side of each other. However, in use, restraint straps 32, 34 may be configured to stack on top of each other and extend through the seat restraint lock channel 225 defined by parallel hook members 218A/B. Restraint strap 36 extends through a second seat restraint lock channel 215 defined by parallel hook members 211A/B and restraint strap 38 extends through a third seat restraint lock channel 215 defined by parallel hook members 213A/B.

In various embodiments, as illustrated in FIGS. 3A-3B and 4A-4B, second restraint hooks arrays 200 are configured to define a first seat restraint locking channels 225 configured to receive restraint straps 32, 34 extending along a first direction (e.g., a direction along a longitudinal axis) and second, third restraint locking channels 215 configured to receive restraint straps 36, 38 extending along a second direction (e.g., a direction along a lateral axis). The first direction referred to herein is not limited to being aligned with the longitudinal axis. Indeed, the directions referenced herein may be switched in accordance with some embodiments such that the first direction is aligned with the lateral axis while the second direction is aligned with the longitudinal axis.

FIGS. 5A-8B depict exemplary embodiments of the restraint system configured for use with occupants that are infants and small toddlers. FIG. 5A shows a first embodiment of a first restraint strap layout pattern wherein restraint straps are configured for securing an infant or small toddler. In the depicted embodiment, a first restraint strap 32 is inserted through a first seat restraint lock channel 225 parallel with the longitudinal axis (e.g., depicted in FIG. 3A). The depicted first seat restraint lock channel 225 is defined by parallel hook members 217A/B. A second restraint strap 34 is inserted through a second seat restraint lock channel 225 parallel with the longitudinal axis. The depicted second seat restraint lock channel 225 is defined by parallel hook members 219A/B. Each of the first restraint strap 32 and the second restraint strap 34 include restraint closure assemblies 80.

A third restraint strap 36 and a fourth restraint strap 38 are inserted through a single third seat restraint lock channel 215 parallel with the lateral axis (e.g., depicted in FIG. 3B). The third seat restraint lock channel 215 is defined by parallel hook members 212A/B. The restraint closure assemblies 80 of the third restraint strap 36 and the fourth restraint strap 38 are positioned at one end of the restraint straps 36, 38 as shown.

FIG. 5B shows the example first restraint strap layout pattern of FIG. 5A with the restraint straps secured to define occupant restraint closure assembly that are configured to secure an occupant. In some embodiments, the restraint closure assembly 80 of each individual restraint strap 32, 34, 36, 38 may be further secured with the addition of a second lock loop 90. In various embodiments, only one restraint strap 32 may secure the restraint closure assembly 80 with the second lock loop 90. In other embodiments, two or more restraint straps may secure the restraint closure assemblies 80 with the second lock loop 90. In the depicted embodiment, the occupant is an infant or toddler and is positioned and secured along the lateral axis with her head positioned outwardly (e.g., positioned with her head toward a passenger side vehicle door) as shown.

FIG. 6A shows a second embodiment of a second restraint strap layout pattern wherein the depicted restraint straps are configured for securing an infant or small toddler. In the depicted embodiment, the first restraint strap 32 is inserted through a first seat restraint lock channel 225 parallel with the longitudinal axis. The first seat restraint lock channel 225 is defined by parallel hook members 217A/B. A second restraint strap 34 is inserted through a second seat restraint lock channel 225 parallel with the longitudinal axis. The second seat restraint lock channel 225 is defined by parallel hook members 219A/B. Each of the first restraint strap 32 and the second restraint strap 34 include restraint closure assemblies 80.

In the depicted embodiment, a third restraint strap 36 and a fourth restraint strap 38 are inserted through a third seat restraint lock channel 215 parallel with the lateral axis. The third seat restraint lock channel 215 is defined by parallel hook members 212A/B. The restraint closure assemblies 80 of the third restraint strap 36 and the fourth restraint strap 38 are positioned at one end of the restraint straps 34, 38 as shown.

FIG. 6B shows the example second restraint strap layout pattern of FIG. 6A with the restraint straps secured to define restraint closure assemblies that are configured to secure an occupant. In some embodiments, the restraint closure assemblies 80 of each individual restraint strap 32, 34, 36, 38 may be further secured with the addition of a second lock loop 90. In various embodiments, only one restraint strap 32 may secure the restraint closure assemblies 80 with the second lock loop 90. In other embodiment, two or more restraint straps may secure the restraint closure assemblies 80 with the second lock loop 90. In the depicted embodiment, the occupant is an infant or toddler and is positioned and secured along the lateral axis with her head positioned inwardly (e.g., positioned with her head toward a drive side vehicle door) as shown.

FIG. 7A shows a third restraint strap layout pattern wherein the depicted restraint straps are configured for securing an infant or small toddler. In the depicted embodiment, a first restraint strap 32 is inserted through a first seat restraint lock channel 215 parallel with the lateral axis, wherein the first seat restraint lock channel 215 is defined by parallel hook members 211A/B. A second restraint strap 34 is inserted through a second seat restraint lock channel 215 parallel with the lateral axis, wherein the second seat restraint lock channel 215 is defined by parallel hook members 213A/B. The first and second restraint straps 32, 34 have restraint closure assemblies 80 positioned at respective outward facing ends as shown.

The depicted embodiment includes a third restraint strap 36 and a fourth restraint strap 38 inserted through a third seat restraint lock channel 225 parallel with the longitudinal axis, wherein the third seat restraint lock channel 225 is defined by parallel hook members 218A/B. The restraint closure assemblies 80 of the third restraint strap 36 and the fourth restraint strap 38 are positioned at one end of the straps away from the back portion as shown.

FIG. 7B shows the example third restraint strap layout pattern of FIG. 7A with the restraint straps secured to define restraint closure assemblies that are configured to secure an occupant. In some embodiments, the restraint closure assemblies 80 of each individual restraint strap 32, 34, 36, 38 may be further secured with the addition of a second lock loop 90. In various embodiments, only one restraint strap 32 may secure the restraint closure assemblies 80 with the second lock loop 90. In other embodiment, two or more restraint straps may secure the restraint closure assemblies 80 with the second lock loop 90. In the depicted embodiment, the occupant is an infant or toddler and is positioned and secured along the longitudinal axis with her head positioned upwardly (e.g., positioned with her head toward the rear of the vehicle) as shown.

FIG. 8A shows a fourth restraint strap layout pattern wherein the depicted restraint straps are configured for securing an infant or small toddler. In the depicted embodiment, a first restraint strap 32 is inserted through a first seat restraint lock channel 215 parallel with the lateral axis, wherein the first seat restraint lock channel 215 is defined by parallel hook members 211A/B. A second restraint strap 34 is inserted through a second seat restraint lock channel 215 parallel with the lateral axis, wherein the second seat restraint lock channel 215 is defined by parallel hook members 213A/B. The first and second restraint straps 32, 34 have restraint closure assemblies 80 positioned at respective outward facing ends as shown.

In the depicted embodiment, a third restraint strap 36 and a fourth restraint strap 38 are inserted through a third seat restraint lock channel 225 parallel with the longitudinal axis, wherein the third seat restraint lock channel 225 is defined by parallel hook members 218A/B. The restraint closure assemblies 80 of the third restraint strap 36 and the fourth restraint strap 38 are positioned at one end of the straps proximate the back portion of the vehicle seat as shown.

FIG. 8B shows the example fourth restraint strap layout pattern of FIG. 8A with the restraint straps secured to define restraint closure assemblies that are configured to secure an occupant. In some embodiments, the restraint closure assemblies 80 of each individual restraint strap 32, 34, 36, 38 may be further secured with the addition of a second lock loop 90. In various embodiments, only one restraint strap 32 may secure the restraint closure assemblies 80 with the second lock loop 90. In other embodiment, two or more restraint straps may secure the restraint closure assemblies 80 with the second lock loop 90. In the depicted embodiment, the occupant is an infant or toddler and is positioned and secured along the longitudinal axis with her head positioned downwardly (e.g., positioned with her head toward the front of the vehicle) as shown.

As will be apparent to one of ordinarily skill in this disclosure, no additional child seat is needed in the embodiments illustrated in FIGS. 5A-8B. The inventor has determined that this may be useful as child safety seats are often installed improperly, which can lead to safety issues. In contrast, the restraint systems structured in accordance with the various embodiments illustrated in FIGS. 5A-8B are structured to comfortably secure occupants including infants and small toddlers to a vehicle seat.

Various embodiments discussed herein are further configured to allow an occupant to be secured in a variety of different positions. In some embodiments, example restraint systems are configured to secure an occupant in supine positions as shown in FIGS. 5B, 6B, 7B, and 8B.

Unlike the conventional three-point seat belt or single strap belt, restraint systems structured in accordance with various embodiments allow for more comfortable adjustment for various sizes of individual. It is an objective of the present disclosure to provide a vehicle restraint system for occupants (adults, children, infants, toddlers) of the vehicle that may be designed into and built into the vehicle passenger seats for cars, SUVs, minivans, vans, trucks, buses, trains, even airplanes.

FIGS. 9A-C depict a restraint strap 36 and restraint closure assembly 80 structured in accordance with various embodiments of the invention. The depicted restraint closure assembly 80 comprises two closure ring members 82, 84 as shown. The closure ring members 82, 84 may be comprised of steel, aluminum, a composite such as carbon fiber, or other strong material. In the depicted embodiment, a free end 31 of the restraint strap 36 is threaded through each of the closure ring members 82, 84 as shown in FIG. 9A. The free end 31 is then drawn back over closure ring member 84 and under closure ring member 82 as shown in FIG. 9B. An occupant may then tighten the restraint strap 36 to a tightened position shown in FIG. 9C by pulling the free end 31 of the restraint strap 36 away from the restraint closure assembly 80 along arrow A as shown in FIG. 9B.

FIGS. 10 and 12 show restraint system configured to secure an adult occupant secured in a vehicle seat in accordance with some embodiments. The depicted restraint system includes three restraint straps 36, 37, 38 each having respective restraint closure assemblies 80. The torso of an example adult occupant is shown for reference in FIG. 10 to provide scale and relative positioning of the depicted three restraint straps 36, 37, 38. In some embodiments, an adult occupant that is taller may need an additional restraint strap (not shown) such that the occupant is secured with at least a fourth restraint strap. In some other embodiments, the adult occupant may be secured to the back portion of the seat with two restraint straps 36, 37. The two restraint straps may be disposed further apart wherein the first restraint strap 36 may secured by a first lock channel defined by 112A and 112B (shown in FIG. 1B) and the second restraint strap 37 may be secured by a second lock channel defined by 114A and 114B (shown in FIG. 1B).

The three restraint straps 36, 37, 38 are secured by three back lock channels (not shown) disposed on an example upper seat restraint hook array of the type shown in FIG. 1B. In some embodiments, the depicted restraint system may further include a second lock loop 90 configured to provide the individual restraint closure assemblies 80 of each restraint strap 36, 37, 38 with additional resistance to back-sliding.

In some embodiments, for smaller adults, teenagers or children, the restraint system can be modified to use only two restraint straps 36, 37 with respective restraint closure assemblies 80 secured by two back restraint lock channels as will be apparent to one of ordinary skill in the art in view of this disclosure. Various embodiments discussed herein are configured to enable restraint systems that are configured to securely fasten adults or children around the abdomen instead of crossing over the neck area providing greater comfort, fit flexibility that is not dependent on occupant size, and enhanced protection in vehicle crashes.

FIG. 11 depicts a restraint strap 36 having a restraint closure assembly 80 that is configured to define a second lock loop 90 in accordance with an additional embodiment of the invention. The depicted restraint closure assembly 80 comprises two closure ring members 82, 84 as discussed in connection with FIGS. 9A/B above. In the depicted embodiment, a free end 31 of the restraint strap 36 is threaded through each of the closure ring members 82, 84 and then drawn back over closure ring member 84 and under closure ring member 82 as shown. The free end 31 is then looped back between the closure ring members 82, 84 and under closure ring member 84 to define the second lock loop 90 as shown. An occupant may then tighten the restraint strap 36 to a tightened position by pulling the free end 31 of the restraint strap 36 away from the restraint closure assembly 80 until a secure fit is achieved. In various embodiments, the second lock loop 90 may provide additional security and resistance to back-sliding in instances of sudden braking, vehicle crashes, etc.

Various embodiments discuss herein are configured to provide secure protection for occupants throughout the duration of a vehicle trip. The restraint and security functionality are not limited to triggering by sudden braking or deceleration. This consistent security can provide greater peace of mind to occupants and can limit the need for secondary redundant security devices such as vehicle airbags.

Restraint systems as discussed herein are further configured to secure occupants in all directions and, thus, provide protection against not only frontal but also side vehicle impacts. Conventional three-point seat belts, in contrast, fail to offer sufficient protection against side impacts because the locking mechanism is activated primarily by quick movement in the forward direction.

In some portable embodiments of the restraint systems, restraint straps may be removed from the above-described restraint hook arrays and deployed in various conventional transportation systems. For example, on an airplane or bus that has individual seats, one or more restraint straps can be inserted around the back of the seat and securely fastened in front of an adult or child passenger. In this embodiment, the restraint system can be used on its own or in addition to the conventional lap belt or three-point seat belt provided.

FIG. 12 depicts the release operation of the restraint closure assembly 80 with a second lock loop 90 in an exemplary restraint system. In order to release the depicted restraint closure assembly 80 with the second lock loop 90 once it is secured, the occupant needs to undo the second lock loop 90 first and then place one hand on the outermost closure ring member 84 and pull the ring closure member 84 in a direction along arrow B. The depicted release operation is an improvement over prior vehicle restraint systems that typically require a spring button release mechanism. Such mechanisms can jam or otherwise prove difficult to release for young children, elderly adults, and others.

In some embodiments, the depicted restraint closure assembly 80 does not comprise a second lock loop 90. In order to release the depicted restraint closure assembly 80 once it is secured, the occupant need only to place one hand on the outermost closure ring member 84 and pull the ring closure member 84 in a direction along arrow B. The depicted release operation is an improvement over prior vehicle restraint systems that typically require a spring button release mechanism. Such mechanisms can jam or otherwise prove difficult to release for young children, elderly adults, and others.

If the specification states a component or feature "can," "could," "should," "would," "preferably," "possibly," "typically," "optionally," "for example," "often," or "might" (or other such language) be included or have a characteristic, that a specific component or feature is not required to be included or to have the characteristic. Such components or features can be optionally included in some embodiments or can be excluded.

As used herein, terms such as "front," "rear," "top," etc. are used for explanatory purposes in the examples provided below to describe the relative positions of certain components or portions of components. As used herein, the term "or" is used in both the alternative and conjunctive sense, unless otherwise indicated. The term "along," and similarly utilized terms, means near or on, but not necessarily requiring directly on an edge or other referenced location. The terms "approximately," "generally," and "substantially" refer to within manufacturing and/or engineering design tolerances for the corresponding materials and/or elements unless otherwise indicated. The use of such terms is inclusive of and is intended to allow independent claiming of specific values listed. Thus, use of any such aforementioned terms, or similarly interchangeable terms, should not be taken to limit the spirit and scope of embodiments of the present invention. As used in the specification and the appended claims, the singular form of "a," "an," and "the" include plural references unless otherwise stated. The terms "includes" and/or "including," when used in the specification, specify the presence of stated feature, elements, and/or components; it does not preclude the presence or addition of one or more other features, steps, operations, elements, components, and/or groups thereof.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

What is claimed is:

1. A vehicle restraint system configured for deployment in connection with a vehicle seat comprising a seat portion and a back portion, the vehicle restraint system comprising:
   a first restraint hook array configured to extend from the back portion of the vehicle seat, wherein the first restraint hook array defines at least one back restraint lock channel;
   a second restraint hook array configured to extend from the seat portion of the vehicle seat, wherein the second restraint hook array defines at least one seat restraint lock channel, wherein the second restraint hook array comprises at least two sets of parallel hook members that are securely anchored to a frame portion of the vehicle seat, and wherein the at least two sets of parallel hook members combine to define two of the at least one seat restraint lock channel;
   at least one restraint strap that is configured to securely engage the at least one of the back restraint lock channel or one of the two of the at least one seat restraint lock channel; and
   a restraint closure assembly structured to slidably close the at least one restraint strap to define the restraint closure assembly that is configured to secure an occupant seated in the vehicle seat.

2. The vehicle restraint system according to claim 1, wherein the first restraint hook array comprises at least two parallel hook members that are securely anchored to a frame portion of the vehicle seat, and wherein the at least two parallel hook members combine to define the at least one back restraint lock channel.

3. The vehicle restraint system according to claim 1, wherein the first restraint hook array comprises at least two sets of parallel hook members that are securely anchored to a frame portion of the vehicle seat, and wherein the at least two sets of parallel hook members combine to define two of the at least one back restraint lock channel.

4. The vehicle restraint system according to claim 1, wherein the at least one restraint strap extends along a first direction, wherein the second restraint hook array comprises at least two other sets of parallel hook members that are securely anchored to the frame portion of the vehicle seat, wherein the at least two other sets of parallel hook members combine to form at least two other restraint lock channels configured to receive a second restraint strap extending along a second direction.

5. The vehicle restraint system according to claim 1, wherein the first restraint hook array comprises at least two sets of parallel hook members that are securely anchored to a frame portion of the vehicle seat, and wherein the at least two sets of parallel hook members combine to define two of the at least one back restraint lock channel positioned in a spaced arrangement along the back portion of the vehicle seat configured to receive the at least one restraint strap and positioned to accommodate occupants of differing heights.

6. The vehicle restraint system according to claim 1, further comprising another restraint strap that is configured to securely engage a second back restraint lock channel or another one of the two of the at least one seat restraint lock channel; and
   another restraint closure assembly structured to slidably close the another restraint strap to define the another restraint closure assembly that is configured to secure the occupant seated in the vehicle seat.

7. A method of manufacturing a vehicle restraint system configured for securing an occupant to a vehicle seat within a vehicle, the method comprising:
   providing a first restraint hook array extending from a back portion of the vehicle seat, wherein the first restraint hook array defines at least one back restraint lock channel;
   providing a second restraint hook array extending from a seat portion of the vehicle seat, wherein the second restraint hook array defines at least one seat restraint lock channel, wherein the second restraint hook array comprises at least two sets of parallel hook members that are securely anchored to a frame portion of the vehicle seat, and wherein the at least two sets of parallel hook members combine to define two of the at least one seat restraint lock channel;
   providing at least one restraint strap that securely engages the at least one of the back restraint lock channel or one of the two of the at least one seat restraint lock channel; and
   providing a restraint closure assembly that is structured to slidably close the at least one restraint strap to define the restraint closure assembly that is configured to secure an occupant seated in the vehicle seat.

8. The method of claim 7, wherein the first restraint hook array comprises at least two parallel hook members that are securely anchored to a frame portion of the vehicle seat, and wherein the at least two parallel hook members combine to define the at least one back restraint lock channel.

9. The method of claim 7, wherein the first restraint hook array comprises at least two sets of parallel hook members that are securely anchored to a frame portion of the vehicle seat, and wherein the at least two sets of parallel hook members combine to define two of the at least one back restraint lock channel.

10. The method of claim 7, wherein the at least one restraint strap extends along a first direction, wherein the second restraint hook array comprises at least two other sets of parallel hook members that are securely anchored to the frame portion of the vehicle seat, wherein the at least two other sets of parallel hook members combine to form at least two other restraint lock channels configured to receive a second restraint strap extending along a second direction.

11. The method of claim 7, wherein the first restraint hook array comprises at least two sets of parallel hook members that are securely anchored to a frame portion of the vehicle seat, and wherein the at least two sets of parallel hook members combine to define two of the at least one back restraint lock channel positioned in a spaced arrangement along the back portion of the vehicle seat configured to receive the at least one restraint strap and positioned to accommodate occupants of differing heights.

12. The method of claim 7, wherein the vehicle restraint system further comprises:
   another restraint strap that is configured to securely engage a second back restraint lock channel or another one of the two of the at least one seat restraint lock channel; and
   another restraint closure assembly structured to slidably close the another restraint strap to define the another restraint closure assembly that is configured to secure the occupant seated in the vehicle seat.

13. The method of claim 7, wherein the restraint closure assembly further comprises a first closure ring and a second closure ring.

14. The method of claim 13, wherein the vehicle restraint system is configured to accommodate drawing at least a portion of the at least one restraint strap over the second closure ring and under the first closure ring when securing the occupant.

15. The method of claim 14, wherein the vehicle restraint system is configured to accommodate creating a second lock loop with the at least one restraint strap, wherein the second lock loop provides additional security and resistance to back-sliding of the restraint closure assembly.

16. The method of claim 15, wherein creating the second lock comprises looping an end of the at least one restraint strap through the first closure ring and wrapping the end of the at least one restraint strap under the second closure ring.

* * * * *